United States Patent
Zheng (10) Patent No.: US 10,760,774 B1
(45) Date of Patent: Sep. 1, 2020

(54) COMPACT SAFER TIGHTLY SECURED LIGHTING SYSTEM

(71) Applicant: FUJIAN OUMEIDA ELECTRIC MACHINE CO., LTD., Fuan, Ningde, Fujian Province (CN)

(72) Inventor: YaoFu Zheng, Fuan (CN)

(73) Assignee: FUJIAN OUMEIDA ELECTRIC MACHINE CO., LTD., Fujian Province (CN)

( * ) Notice: Subject to any disclaimer, the term of this patent is extended or adjusted under 35 U.S.C. 154(b) by 0 days.

(21) Appl. No.: 16/567,132

(22) Filed: Sep. 11, 2019

(51) Int. Cl.
| | |
|---|---|
| F21V 15/04 | (2006.01) |
| F16F 15/06 | (2006.01) |
| F21V 15/01 | (2006.01) |
| F21S 8/02 | (2006.01) |
| F21V 23/04 | (2006.01) |
| F21V 29/70 | (2015.01) |
| F21V 29/74 | (2015.01) |

(52) U.S. Cl.
CPC .............. F21V 15/04 (2013.01); F16F 15/06 (2013.01); F21S 8/02 (2013.01); F21S 8/026 (2013.01); F21V 15/01 (2013.01); F21V 23/0442 (2013.01); F21V 29/70 (2015.01); F21V 29/745 (2015.01)

(58) Field of Classification Search
CPC ........... F16F 15/06; F21V 29/70; F21V 15/01
See application file for complete search history.

(56) References Cited

U.S. PATENT DOCUMENTS

| | | | |
|---|---|---|---|
| 2011/0075414 A1* | 3/2011 | Van De Ven | ........... F21V 15/01 362/235 |
| 2012/0033419 A1* | 2/2012 | Kim | ....................... F21V 29/505 362/235 |
| 2014/0168944 A1* | 6/2014 | Osada | ...................... F21V 23/06 362/95 |
| 2015/0233537 A1* | 8/2015 | Athalye | .................. F21V 7/041 362/147 |
| 2015/0276141 A1* | 10/2015 | White | ..................... F21V 29/70 362/147 |

(Continued)

*Primary Examiner* — Alexander K Garlen
*Assistant Examiner* — Eric T Eide
(74) *Attorney, Agent, or Firm* — Alan D. Kamrath; Mayer & Williams PC (57) ABSTRACT

A compact safer tightly secured lighting system comprises an illumination element module, a terminal box, an illumination element module driver, and a junction box, wherein the illumination element module is composed of a heat sink and a lamp housing. An outer wall of a lower end of the heat sink has a circular recess provided for embedding a temperature controller. The lamp housing is composed of an external case, a reflective cup, a protection mask and a plurality of circlips having elasticity. A spacing is between the outer wall of the protection mask and the internal wall of the external case. The circlip is disposed to an outer wall of the protection mask, where one end is joined to a top end of the protection mask while another end has a tooth buckle corresponding to the internal wall of the external case. The tooth buckle stretches into the spacing to allow the circlip to locate between the external case and the protection mask so as to closely combine the protection mask and the external case. The terminal box is locked and connected by a locking mechanism.

5 Claims, 7 Drawing Sheets

(56) References Cited

U.S. PATENT DOCUMENTS

2018/0058668 A1* 3/2018 Park .................. F21V 21/045
2018/0166912 A1* 6/2018 Ren .................... H02J 9/061
2019/0101266 A1* 4/2019 Shah .................. F21V 17/18

* cited by examiner

COMPACT SAFER TIGHTLY SECURED LIGHTING SYSTEM

BACKGROUND OF THE INVENTION

Field of the Invention

The present invention relates to a compact safer tightly secured lighting system, and more particularly to a structure capable of preventing it from being damaged by any vibration to avoid loosening electric wires inside the lamp, resulting in electric shock and/or electric fire caused by short circuit.

Description of the Related Art

A lamp is equipment capable of converting electric power into light energy and primarily applied in illuminance. A conventional lamp is normally mounted to a ceiling and composed of a illuminance element module, a temperature controller, a terminal box, a illuminance element module driver, and a junction box, wherein the illuminance element nodule is composed of a illuminance element and a heat sink. The illuminance element is disposed to a bottom end of the heat sink. The temperature controller is connected to the illuminance element module through an electric wire. The terminal box is respectively connected to the temperature controller and the illuminance element module through an electric wire. The illuminance element module driver is connected to the terminal box and the illuminance element module through an electric wire. The junction box is connected to the illuminance element module driver through an electric wire.

However, in case of disaster, earthquakes or storm coming for example, components of the lamp may come off or be separated due to vibration. Moreover, the wires among these components may fall off due to the foregoing reason to result in electric shock or fire disaster from short circuit. To overcome the foregoing shortcomings, the subsequent improved design through innovation and development of the inventor(s) is submitted in order to provide robustness lamp.

SUMMARY OF THE INVENTION

Therefore, it is a primary objective of the present invention to provide a compact safer tightly secured lighting system capable of preventing an electric lamp from being damaged by any vibration to mainly avoid components of the electric lamp from coming off and electric wires inside the electric lamp from being loosen, resulting in electric fire caused by short circuit.

To achieve the foregoing objective, the safer secured lighting system according to the invention comprises an illumination element module, a terminal box, an illumination element module driver and a junction box.

To achieve the above-mentioned objective, the present invention comprises an illumination element module, a terminal box, an illumination element module driver and a lamp housing, and wherein, the illumination element module composed of a heat sink and a lamp housing, a top end of the lamp housing connected to a bottom end of the heat sink, wherein the middle at the bottom end of the heat sink is recessed with a slot, and a top end in the slot is disposed with an illumination element, and an outer wall at a lower end of the heat sink has a circular recess, and the recess is provided for embedding a temperature controller, and the illumination element is electrically connected to the temperature controller. The lamp housing is composed of an external case, a reflective cup, a protection mask and a plurality of circlips having elasticity, wherein a top end of the external case is locked and connected to the bottom end of the heat sink; the reflective cup is disposed in the external case, and the top end of the reflective cup stretched from the top end of the external case and stretched into the bottom end of the illumination element module, and the reflective cup located below the illumination element; the protection mask disposed in the external case and located below the reflective cup, a spacing contained between an outer wall of the protection mask and an internal wall of the external case; the circlip disposed to the outer wall of the protection mask, where one end lap-connected to a top end of the protection mask while another end has a tooth buckle corresponding to the internal wall of the external case, the tooth buckle stretched into the spacing so that the circlip locates between the external case and the protection mask. The terminal box is electrically connected to the temperature controller and the illumination element through an electric wire and having an upper lid and a lower lid and locked and connected to the upper lid and the lower lid through a locking mechanism. The illumination element module driver is electrically connected to the terminal box through an electric wire. The junction box is electrically connected to the illumination element module through an electric wire.

According to the above mentioned compact safer tightly secured lighting system, the electric wire is disposed in a hose, and the hose is respectively disposed with a hose-end tightening mechanism provided for connecting the temperature controller, the terminal box, the illumination element module driver, and the junction box, the hose-end tightening mechanism composed of a sheet body and a plurality of fixing members, the sheet body having a perforation passed by the hose so that each of the hoses passes through the temperature controller, the terminal box, the illumination element module controller, and the junction box, a side of each of the sheet bodies respectively locked and connected to the temperature controller, the terminal box, the illumination element module driver, and the junction box through the fixing member, two sides at another side of the sheet body respectively extended with an extension sheet, a surface of one of the extension sheets having a screw hole, the screw hole provided for locking a screw to lock the two extension sheets, the hose tightly clipped by the two extension sheets.

According to the above mentioned compact safer tightly secured lighting system, the locking mechanism of the terminal box is composed of an opening, an engagement sheet, an open cavity, a bump and a locking member, wherein the opening is disposed at a side of the lower lid; and the engagement sheet is disposed to the upper lid and capable of combining the opening; and the two open cavities are respectively disposed at two ends of the upper lid and correspond to each other; and the bump is disposed at one end of the lower lid, and the bump is accommodated in the open cavity, and the locking member is locked and connected to the lower lid after passing through the upper lid.

According to the above mentioned compact safer tightly secured lighting system, the illumination element module is connected to a lamp rack, and one end of the lamp rack has an opening, and the opening is provided for connecting the illumination element module, and one end surface of the lamp rack is connected to the bottom end of the junction box.

According to the above mentioned compact safer tightly secured lighting system, the top end of the external case is locked and connected to the bottom end of the heat sink through a plurality of torsional spring devices, and the torsional spring device is composed of a screw nut, a spring and a screw bolt, and the screw bolt firstly passes and sleeves through the spring from a bottom to a top and further passes through a cavity at a bottom end below the heat sink so as to screw the screw nut at the top; and the top end of the external case has a latch hole corresponding to the torsional spring device to provide the screw bolt to rotate and lock after the screw bolt passes through the latch hole.

Upon foregoing, by locking and connecting the temperature controller in the recess, the temperature controller can be prevented from falling due to vibration of storms or earthquakes of any natural disaster. With a tooth-shaped buckle of the circlip snapped to the housing, the protection mask can be exactly and tightly snapped in the housing so that it can prevent the protection mask from falling due to vibration of storms or earthquakes of any natural disaster. Since the locking and connecting structure of the terminal box locks an upper cover and a lower cover of the terminal box, the terminal box can be prevented from being damaged by vibration of storms or earthquakes of any natural disaster. With the hose-end tightening mechanism of the hose locking the hose, the hose can be prevented from being damaged by vibration of storms or earthquakes of any natural disaster, avoiding electric wires inside the hose from loosening or falling to cause electric shock or fire disaster from leakage short circuit.

DETAILED DESCRIPTION OF THE PREFERRED EMBODIMENTS

The technical characteristics, contents, advantages and effects of the present invention will be apparent with the detailed description accompanied with related drawings of two preferred embodiments as follows.

Figure 1:
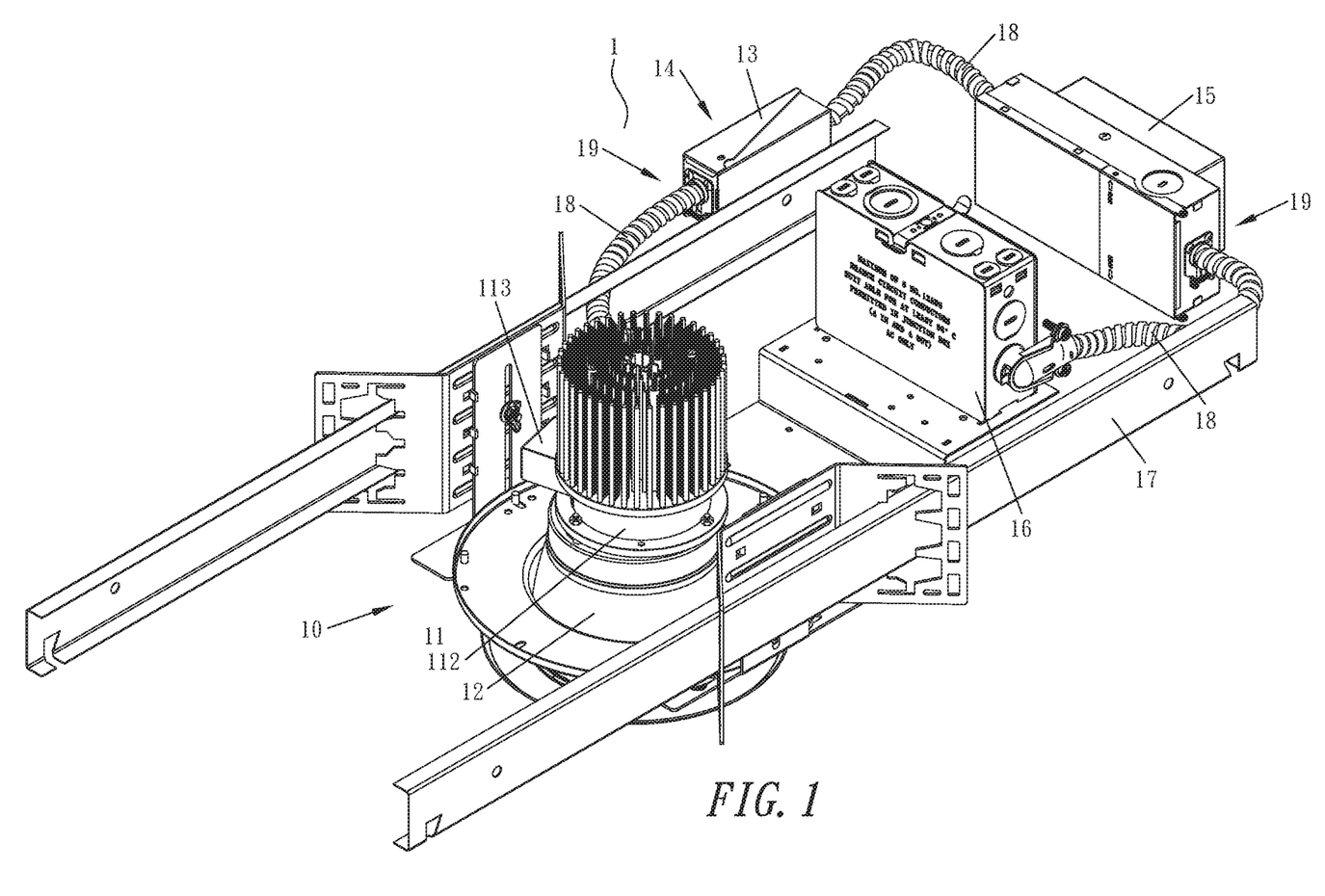
FIG. 1 is a three-dimensional drawing according to a first embodiment of the present invention.
Figure 2:
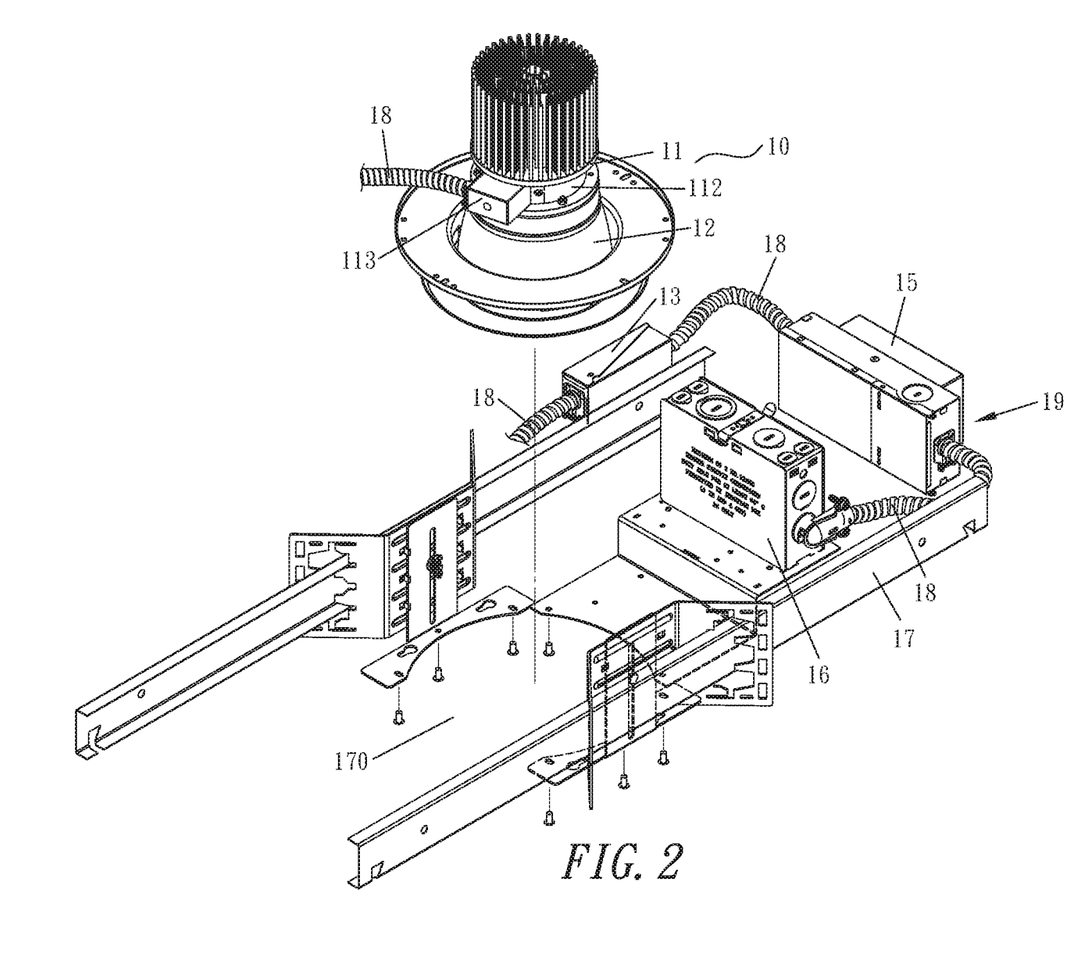
FIG. 2 is a partial three-dimensional decomposition drawing according to FIG. 1 of the invention.
Figure 3:
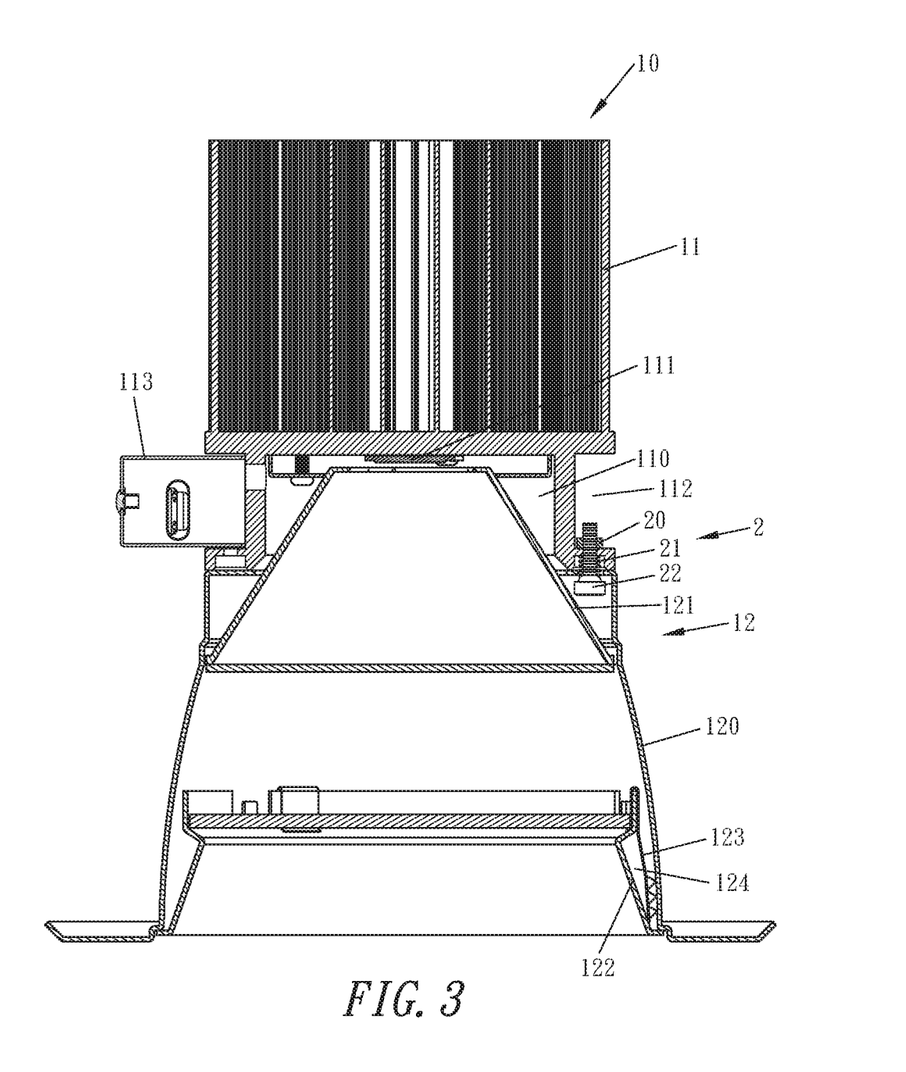
FIG. 3 is an assembled cross-sectional drawing of a illumination element module according to the first embodiment of the invention.

With reference to FIGS. 1-3, a safer secured lighting 1 according to a first embodiment of the invention comprises: a illumination element module 10 composed of a heat sink 11 and a lamp housing 12. A top end of the lamp housing 12 is connected to a bottom end of the heat sink 11, wherein a middle at the bottom end of the heat sink 11 is recessed with a slot 110 (as shown in FIG. 3). A top end inside the slot 110 is disposed with a illumination element 111. An outer wall of a lower end of the heat sink 11 has a circular recess 112. A space of the recess 112 can be exactly accommodated by an inside portion of a temperature controller 113 and stably locked. An electrical connection relation is achieved between the illumination element 111 and the temperature controller 113. When the temperature controller 113 is used for detecting ambient temperature to reach a certain value, a power source is cut off to prevent the illumination element 111 from overheating.

A terminal box 13 is electrically connected to the temperature controller 113 and the illumination element 111 through an electric wire. The terminal box 13 has an upper lid 130 and a lower lid 131, and uses a locking mechanism 14 to lock the upper lid 130 and the lower lid 131.

An illumination element module driver 15 is electrically connected to the terminal box 13 through an electric wire.

A junction box 16 is electrically connected to the illumination element module driver 15 through an electric wire. The junction box 16 is connected to a power source (supply mains for example) to supply required power.

A lamp rack 17 is connected to the illumination element module 10. One end of the lamp rack 17 has an opening 170. The opening 170 is provided for connecting the illumination element module 10. A surface at one end of the lamp rack 17 is connected to a bottom end of the junction box 16.

Figure 4:
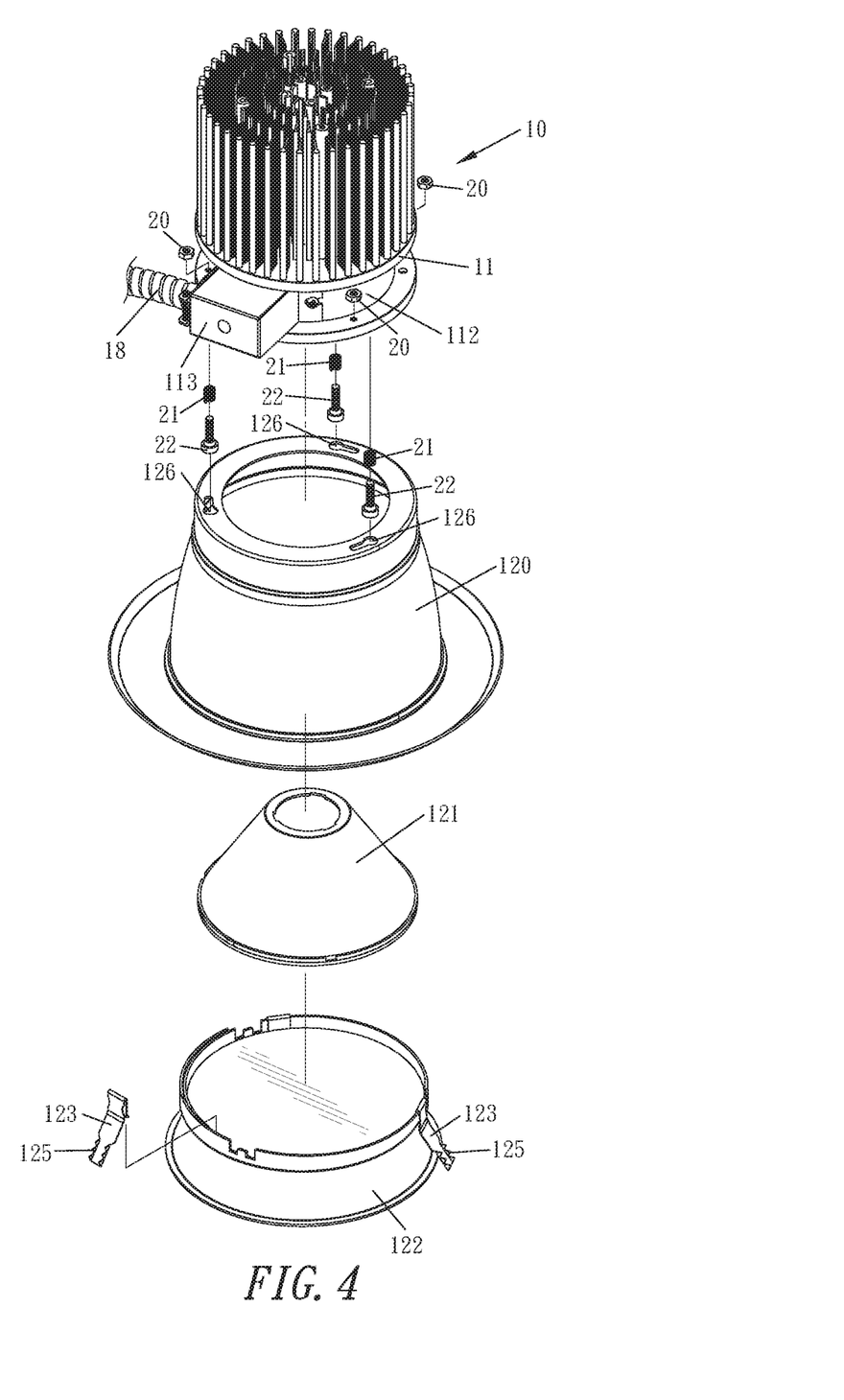
FIG. 4 is a three-dimensional decomposition drawing of the illumination element module according to the first embodiment of the invention.

With reference to FIGS. 3, 4, the lamp housing 12 is composed of an external case 120, a reflective cup 121, a protection mask 122, and a plurality of circlips 123 having elasticity, wherein a top end of the external case 120 is locked and connected to a bottom end of the heat sink 11. The reflective cup 121 is disposed inside the external case 120. A top end of the reflective cup 121 is stretched from a top end of the external case 120 and passed into the slot 110. The reflective cup 121 locates below the illumination element 111. The protection mask 122 is disposed inside the external case 120 and locates below the reflective cup 121. A spacing is between an outer wall of the protection mask 122 and an internal wall of the external case 120. The circlip 123 is disposed at the outer wall of the protection mask 122, where one end is lap-joined to a top end of the protection mask 122 while another end has a tooth buckle 125 corresponding to the internal wall of the external case 120. The tooth buckle 125 stretches into the spacing 124 to allow the circlip 123 to locate between the external case 120 and the protection mask 122.

Upon foregoing, the top end of the external case 120 is locked and connected to the bottom end of the heat sink 11 through a plurality of torsional spring devices 2. The torsional spring device 2 is composed of a screw nut 20, a spring 21, and a screw bolt 22. The screw bolt 22 firstly passes and sleeves through the spring 21 from the bottom to the top and further passes through a cavity at the bottom end below the heat sink 11 so as to screw the screw nut 20 at the top. The top end of the external case 120 has a latch hole 126 corresponding to the torsional spring device 2 to provide the screw bolt 22 to rotate and lock after the screw bolt 22 passes thereto.

With reference to FIGS. 1, 2, 5, 6, the electric wire is disposed in a hose 18, and the hose 18 is respectively disposed with a hose-end tightening mechanism 19 provided for connecting the temperature controller 113, the terminal box 13, the illumination element module driver 15, and the junction box 16. The hose-end tightening mechanism 19 is composed of a sheet body 190 and a plurality of fixing members 191. The sheet body 190 has a perforation 192 pierced by the hose 18 to allow the hose 18 passing through connected temperature controller 113, the terminal box 13, the illumination element module driver 15, and the junction box 16 from the perforation 192. One side of each of the sheet bodies 19 is respectively locked and connected to the temperature controller 113, the terminal box 13, the illumination element module driver 15 and the junction box 16 through the fixing member 191. Two ends of another side of the sheet body 190 is respectively extended with an extension sheet 193. A surface of one of the extension sheet 193 has a screw hole 194. The screw hole 194 is locked by a screw 195 to lock the two extension sheets 193 so that the hose 18 is tightly clipped by the two extension sheets 193.

Figure 5:
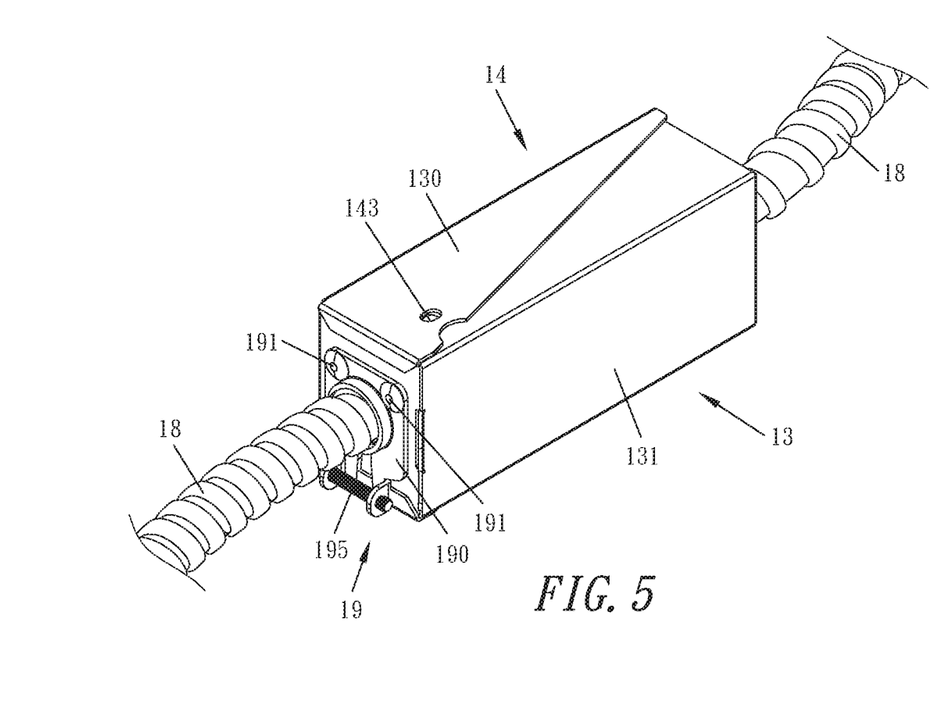
FIG. 5 is a three-dimensional drawing of a junction box according to the first embodiment of the invention.
Figure 6:
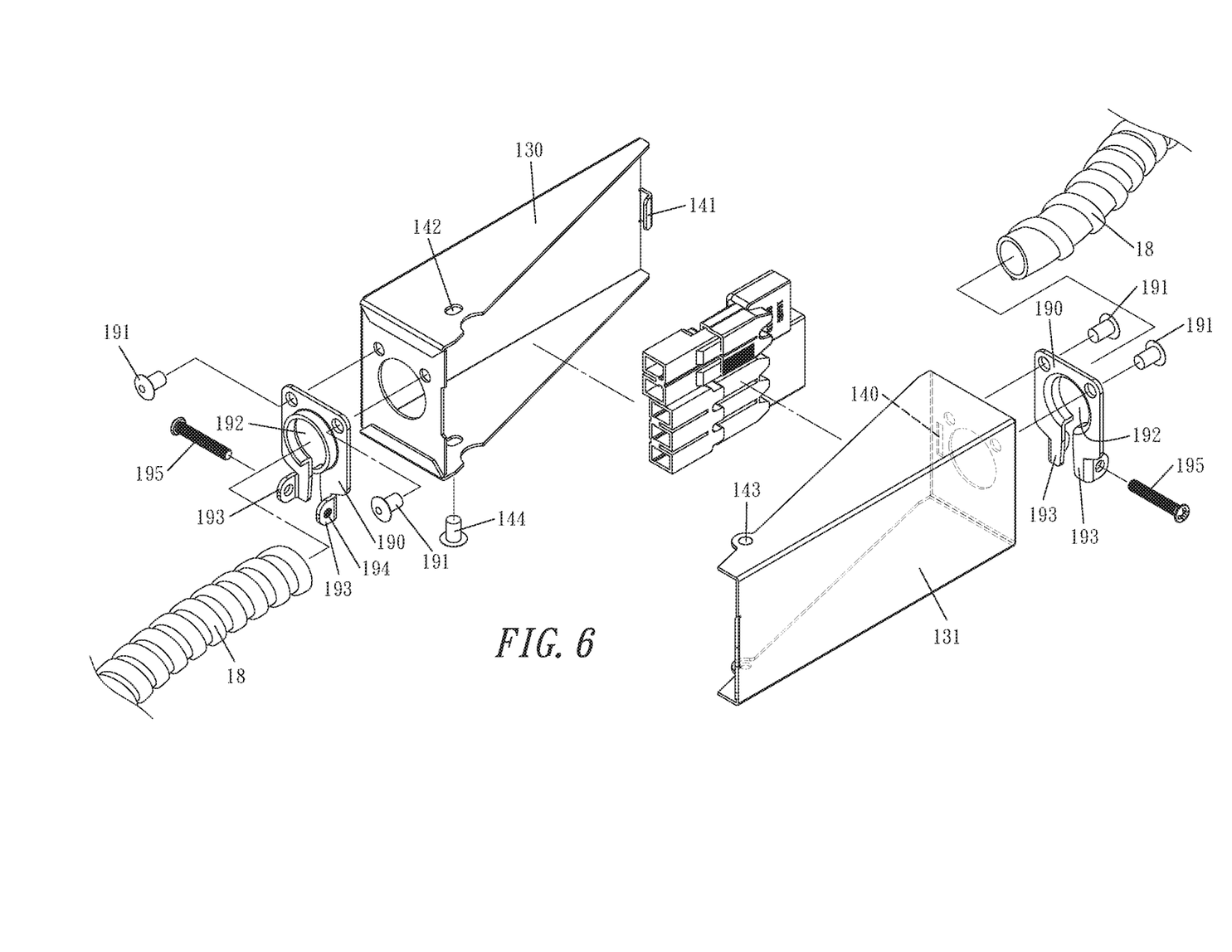
FIG. 6 is a three-dimensional decomposition drawing according to FIG. 5.

With reference to FIGS. 5, 6, the locking mechanism 14 is composed of an opening 140, an engagement sheet 141, an open cavity 142, a bump 143 and a locking member 144, wherein the opening 140 is disposed at a side of the lower lid 131. The engagement sheet 141 is disposed at the upper lid 130 and combined with the opening 140. Two open cavities 142 are respectively disposed at two ends of the upper lid 130 and correspond to each other. The bump 143 is disposed at one end of the upper lid 131. The bump 143 can be accommodated in the corresponding open cavity 142. The locking member 144 can be locked and connected to the lower lid 131 after passing through the upper lid 130.

With reference to FIGS. 2, 3, since the temperature controller 113 is locked and connected in the recess 112, the temperature controller 113 is protected and locked by the recess 112 such that it can prevent the temperature controller 113 from falling due to vibration caused by storms or earthquakes of any natural disaster.

With reference to FIGS. 3, 4, when the protection mask 122 is combined with the external case 120, the external case 120 is snapped by the tooth buckle 125 of the circlip 123 to allow the protection mask 122 to be exactly and tightly snapped in the external case 120. Therefore, it can prevent the protection mask 122 from falling due to vibration of storms or earthquakes of any natural disaster.

With reference to FIGS. 5, 6, when the upper lid 130 of the terminal box 13 is combined with the lower lid 131, the engagement sheet 141 is engaged into the opening 140 after the bump 143 is accommodated into the open cavity 142. Afterward the locking member 144 is locked and connected to the lower lid 131 after passing through the upper lid 130 so that the upper lid 130 is combined with the lower lid 131 to form the terminal box 13. With the locking structure 14 of the terminal box 13, the terminal box 13 can be prevented from being damaged by vibration of storms or earthquakes of any natural disaster.

With reference to FIGS. 1, 2, 5, 6, after each of the hoses 18 passes through the temperature controller 113, the terminal box 13, the illumination element module driver 15, the junction box 16 from the perforation 16. Each sheet body 190 is respectively locked and connected to the temperature controller 113, the terminal box 13, the illumination element module driver 15, and the junction box 16 through the fixing member 191. Afterward the two extension sheets 193 are locked and connected by the screw 195 to lock the two extension sheet 193. The hose 18 is tightly clipped by the two extension sheets 193. With the hose-end tightening mechanism 19 of the hose 18, the hose 18 can be prevented from being damaged by vibration of storms or earthquakes of any natural disaster to avoid electric wires inside the hose 18 from loosening or falling to result in fire disaster from leakage short circuit.

Figure 7:
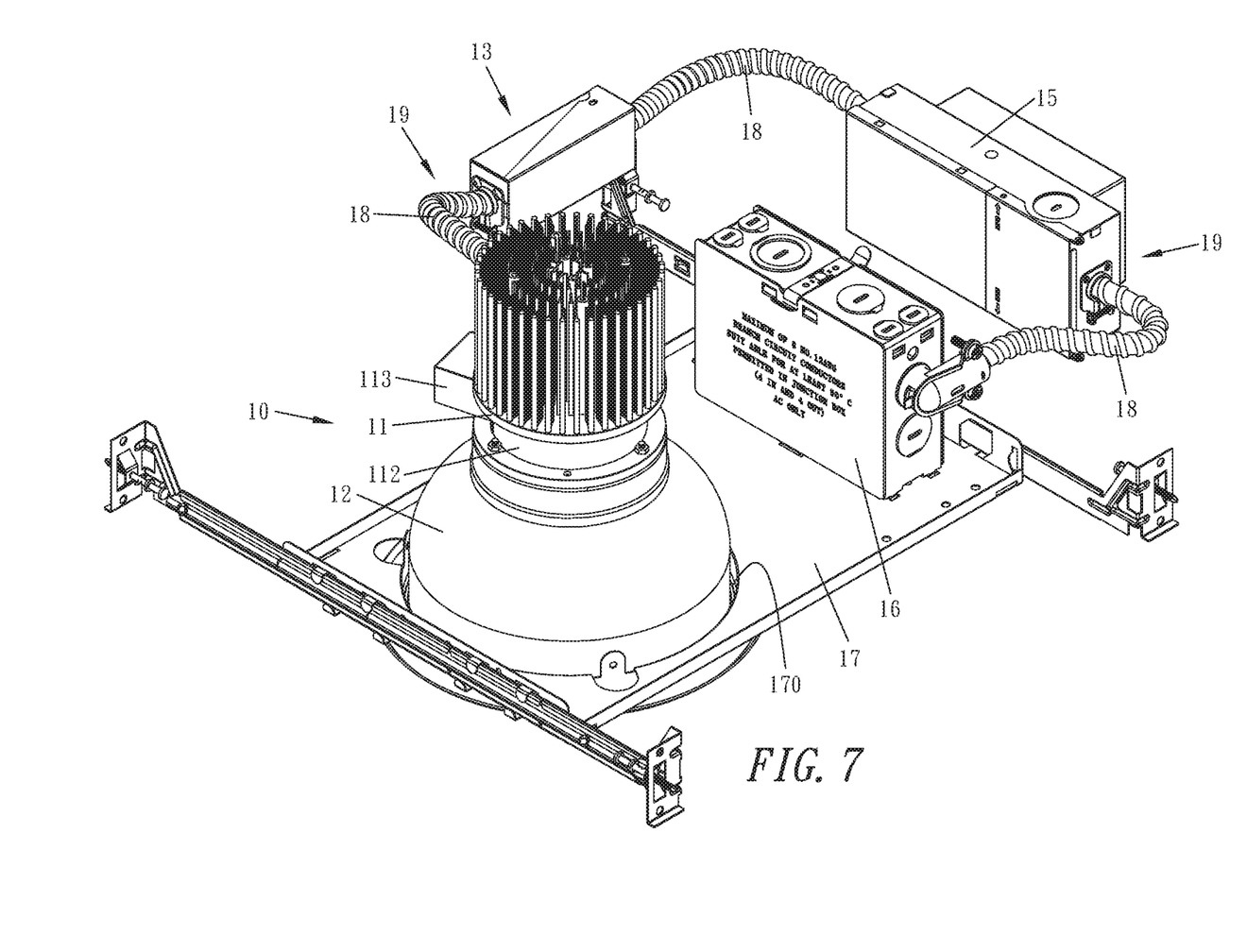
FIG. 7 is a three-dimensional drawing according to a second embodiment of the invention.

With reference to FIG. 7, the different place between the first embodiment and the second embodiment is that the lamp rack disclosed by the second embodiment can be utilized by cooperating with different ceiling structures. Since other elements and achieved efficacy is equivalent to the first embodiment, there is no need to be illustrated again.

Therefore, the disclosure has the following advantages:
1. With the temperature controller 113 locked and connected in the recess 112, the temperature controller 113 can be prevented from falling due to vibration caused by storms or earthquakes of any natural disaster.
2. With the tooth buckle 125 of the circlip 123 buckled to the external case 120, the protection mask 122 can be exactly and tightly snapped in the external case 120 so that the protection mask 122 can be prevented from falling due to vibration caused by storms or earthquakes of any natural disaster.
3. Since the locking structure 14 of the terminal box 13 is locked to the upper lid 130 and the lower lid 131 of the terminal box 13, the terminal box 13 can be prevented from falling due to vibration caused by storms or earthquakes of any natural disaster.
4. With the hose-end tightening mechanism 19 of the hose 18 locking the hose 18, the hose 18 can be prevented from being damaged by vibration caused from storms or earthquakes of any natural disaster, avoiding electric wires in the hose 18 from loosening or falling to result in electric shock or fire disaster from leakage short circuit.

While the present invention has been described by means of specific embodiments, numerous modifications and variations could be made thereto by those skilled in the art without departing from the scope and spirit of the invention set forth in the claims.

What is claimed is:

1. A compact safer tightly secured lighting system comprising:

an illumination element module composed of a heat sink and a lamp housing, a top end of the lamp housing connected to a bottom end of the heat sink, wherein a middle at the bottom end of the heat sink is recessed with a slot, and a top end in the slot is disposed with an illumination element, and an outer wall at a lower end of the heat sink has a circular recess, and the recess is provided for embedding a temperature controller, and the illumination element is electrically connected to the temperature controller; the lamp housing composed of an external case, a reflective cup, a protection mask and a plurality of circlips having elasticity, wherein a top end of the external case is locked and connected to the bottom end of the heat sink; the reflective cup disposed in the external case, a top end of the reflective cup stretched from the top end of the external case and stretched into the slot of the heat sink, the reflective cup located below the illumination element; the protection mask disposed in the external case and located below the reflective cup, a spacing contained between an outer wall of the protection mask and an internal wall of the external case; the circlip disposed to the outer wall of the protection mask, where one end lap-connected to a top end of the protection mask while another end has a tooth buckle corresponding to the internal wall of the external case, the tooth buckle stretched into the spacing so that the circlip locates between the external case and the protection mask to allow the tooth buckle to paste the internal wall of the external case and the outer wall of the protection mask;

a terminal box electrically connected to the temperature controller and the illumination element through an electric wire and having an upper lid and a lower lid and locked and connected to the upper lid and the lower lid through a locking mechanism;

an illumination element module driver electrically connected to the terminal box through an electric wire;

a junction box electrically connected to the illumination element module through an electric wire.

2. The compact safer tightly secured lighting system of claim 1, wherein the electric wire is disposed in a hose, and the hose is respectively disposed with a hose-end tightening mechanism provided for connecting the temperature controller, the terminal box, the illumination element module driver, and the junction box, the hose-end tightening mechanism composed of a sheet body and a plurality of fixing members, the sheet body having a perforation passed by the hose so that each of the hoses passes through the temperature controller, the terminal box, the illumination element module controller, and the junction box, a side of each of the sheet bodies respectively locked and connected to the temperature controller, the terminal box, the illumination element module driver, and the junction box through the fixing member, two sides at another side of the sheet body respectively extended with an extension sheet, a surface of one of the extension sheets having a screw hole, the screw hole provided for locking a screw to lock the two extension sheets, the hose tightly clipped by the two extension sheets.

3. The compact safer tightly secured lighting system of claim 1, wherein the locking mechanism of the terminal box is composed of an opening, an engagement sheet, an open cavity, a bump and a locking member, wherein the opening is disposed at a side of the lower lid; and the engagement sheet is disposed to the upper lid and capable of combining the opening; and the two open cavities are respectively disposed at two ends of the upper lid and correspond to each other; and the bump is disposed at one end of the lower lid, and the bump is accommodated in the open cavity, and the locking member is locked and connected to the lower lid after passing through the upper lid.

4. The compact safer tightly secured lighting system of claim 1, wherein the illumination element module is connected to a lamp rack, and one end of the lamp rack has an opening, and the opening is provided for connecting the illumination element module, and one end surface of the lamp rack is connected to the bottom end of the junction box.

5. The compact safer tightly secured lighting system of claim 1, wherein the top end of the external case is locked and connected to the bottom end of the heat sink through a plurality of torsional spring devices, and the torsional spring device is composed of a screw nut, a spring and a screw bolt, and the screw bolt firstly passes and sleeves through the spring from a bottom to a top and further passes through a cavity at a bottom end below the heat sink so as to screw the screw nut at the top; and the top end of the external case has a latch hole corresponding to the torsional spring device to provide the screw bolt to rotate and lock after the screw bolt passes through the latch hole.

\* \* \* \* \*